United States Patent

Denize et al.

Patent Number: 6,044,969
Date of Patent: Apr. 4, 2000

[54] PACKAGING DEVICE FOR A DISC-SHAPED OBJECT

[76] Inventors: Pascal Denize, c/o Sjonander, Hallandsgatan 40, S-118 57; Alexandre Lechere, Kungsholmstrand 157, S-112 48, both of Stockholm, Sweden

[21] Appl. No.: 09/147,125
[22] PCT Filed: Apr. 15, 1997
[86] PCT No.: PCT/SE97/00633
§ 371 Date: Oct. 14, 1998
§ 102(e) Date: Oct. 14, 1998
[87] PCT Pub. No.: WO97/38920
PCT Pub. Date: Oct. 23, 1997

[30] Foreign Application Priority Data

Apr. 15, 1996 [SE] Sweden .................. 9601431-1

[51] Int. Cl.[7] .................................................. B65D 85/57
[52] U.S. Cl. .................................. 206/308.1; 206/312
[58] Field of Search ........................ 206/308.1, 308.3, 206/309, 310, 312, 313

[56] References Cited

U.S. PATENT DOCUMENTS 5,460,265  10/1995  Kiolbasa .................. 206/308.1
5,772,018  6/1998  Walch .................. 206/308.1

FOREIGN PATENT DOCUMENTS

WO 93/2497  12/1993  WIPO .................. 206/308.1

*Primary Examiner*—David T. Fidei

[57] ABSTRACT

A fixator for a disc-shaped object includes a substantially flat and unbroken lower end plate, a substantially flat upper end plate and an intermediate portion having slots constructed and arranged to hold the disc-shaped object therein. The intermediate portion is formed of at least two layers, including a lower intermediate layer adjacent the lower end plate a formed of unconnected right and left arms having a larger, generally U-shaped slot therebetween having a width less than the diameter of the disc-shaped object such that a peripheral portion of the disc-shaped object held in the fixator will rest upon the arms of the lower intermediate layer, with the larger slot being joined to a smaller slot, and an upper intermediate layer formed of unconnected right and left arms having a larger, generally U-shaped retaining slot therebetween having a width which is substantially the width of the disc-shaped object, such that an edge portion of the disc-shaped object is retained between the arms of the upper intermediate layer, the larger retaining slot being joined to a smaller slot.

7 Claims, 1 Drawing Sheet

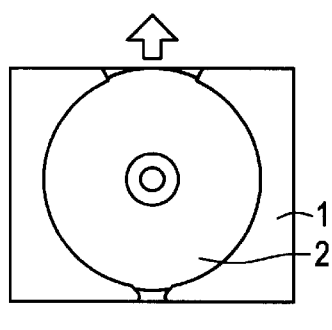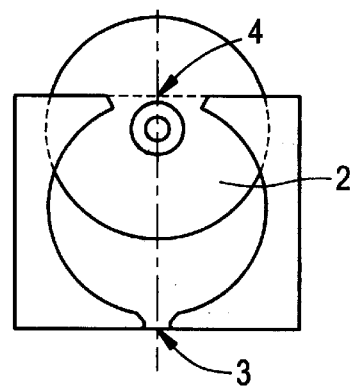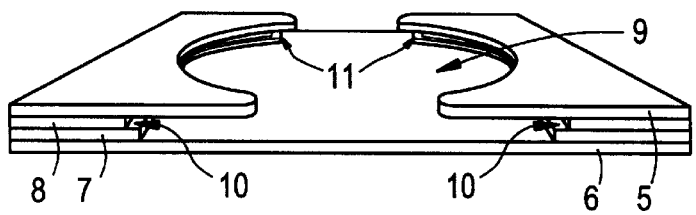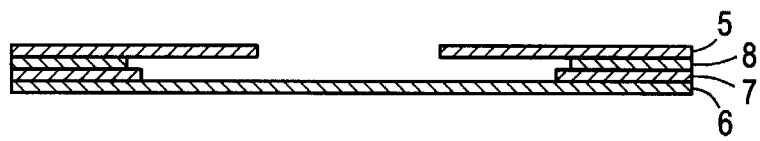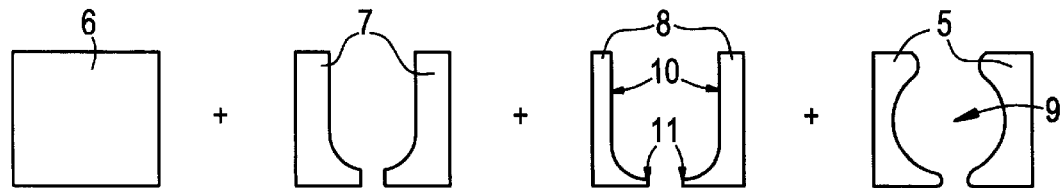

PACKAGING DEVICE FOR A DISC-SHAPED OBJECT

FIELD OF THE INVENTION

The present invention relates to a fixator for disc-shaped objects such as compact discs or other gramophone records, comprising two flat end plates and side portions joining these together, parallel slots being formed in the side portions, starting from one side and terminating in a semi-circular slot connecting the parallel slots, said slots being intended for the insertion and storage of objects.

DESCRIPTION OF RELATED ART

CD discs and other disc-shaped objects are normally packed and stored in plastic sleeves which leads to environmental problems in the long term. The sleeves may also crack and often cover the graphic printing on the disc. It is also often difficult to them to open without some practice. A material is sought which can easily be burned after use without leading to environmental problems, where the packed product is easily visible and which at the same time provides a durable and inexpensive wrapping.

SUMMARY OF THE INVENTION

The invention constitutes a solution to these and other associated problems and is characterized in that the side portions comprise at least two layers encompassing the outer sides of the slots, an upper layer in contact with the outer edge of the disc and forming the bottom of the slot, and a layer arranged below the upper layer and in contact with the outermost peripheral parts of the disc not consisting of recorded parts of the disc, said layers being designed, together with an upper end plate, to clamp a disc that has been inserted.

As mentioned above, this fixator may constitute part of a wrapper, such as the sleeve of a CD disc. The object, which may be a CD disc, is stored with its recorded part a certain distance from the uninterrupted bottom end plate and can therefore be kept free from dirt particles, scratches and the like which might cause disturbance when playing the disc. The upper end plate can be provided with a central opening clearly showing the label on the disc. Fixation will be durable and secure. By making the slot marginally narrower than the disc and its thickness marginally less than the thickness of the disc, the object is "clamped" firmly and the fixator is durable and secure. No damaging waste gases are obtained when this fixator is burned, as would be the case if it were made of plastic.

BRIEF DESCRIPTION OF THE DRAWINGS

FIG. 1 is a top plan view of a fixator according to the invention with a disc inserted;

FIG. 2 is a top plan view of a fixator according to the invention with a disc partially withdrawn;

FIG. 3 is a perspective view of the fixator of the invention;

FIG. 4 is a cross-sectional view of the fixator of FIG. 3; and

FIGS. 5A–5D are top plan views of each layer of the fixator of the invention.

DESCRIPTION OF THE PREFERRED EMBODIMENTS

Description of Embodiment

FIG. 1 shows an object (2), such as a CD disc, inserted in a fixator (1) according to the invention and FIG. 2 shows the same disc partially withdrawn. As can be seen, the uppermost end plate is provided with a central opening which fully reveals the label, and one or two open parts (3, 4) extend from this opening to the periphery. These facilitate insertion and withdrawal of the disc.

FIG. 3 shows a fixator according to the invention (with no disc inserted). It consists of an uninterrupted bottom end plate (6) and an upper end plate (5) provided with an opening (9), see also FIGS. 1 and 2. These end plates are joined by side portions, in this case two layers (7, 8). The lower bottom end plate is also shown in FIG. 5A and the upper end plate in FIG. 5D.

Two parallel slots (10) are formed in the side layers (7, 8), see also FIG. 5C, terminating in a semi-circular slot (11). The disc shall be inserted in this slot (10, 11) and the shape of the slot is also shown in FIG. 4. It is formed by a side layer (8) which shall abut against the periphery of the disc and form the deepest part of the slot (10, 11). A second side layer (7) is arranged beneath the first layer, which shall rest against the outer edge of the disc, i.e. against the unrecorded parts of the disc, see also FIG. 5B. The width of the slot shall be marginally less than the width of the disc (approx. 0.5 mm less), and its height shall be marginally less (one to two tenths of a millimeter) than the thickness of the disc, so that the disc will be retained with a certain force. The slot (10, 11) is located a certain height above the bottom end plate (6) so that a gap is formed between the inserted disc and the bottom end plate, the recorded parts of the disc thus being kept free from dirt particles, scratches and the like.

The outwardly directed part of the parallel parts of the slot (10) can be made gently diverging in order to facilitate insertion of the disc (not shown).

A high-quality product is thus obtained, having accurately controlled properties, which is not easily broken—at worst the edges may become worn—and is able to withstand wet and damp. The graphic printing on an inserted disc is not hidden and the inserted disc is protected against knocks, wear and other undesirable external influences, as well exploiting the native paper industry—an important aspect.

The invention can be varied in many ways within the scope of the following claims.

What is claimed is:

1. A fixator for a disc-shaped object of predetermined diameter and thickness, comprising a substantially flat and unbroken lower end plate, a substantially flat upper end plate and an intermediate portion having slots constructed and arranged to hold the disc-shaped object therein, said intermediate portion comprising at least two layers, including a lower intermediate layer adjacent the lower end plate a formed of unconnected right and left arms having a larger, generally U-shaped slot therebetween having a width less than the diameter of the disc-shaped object such that a peripheral portion of the disc-shaped object held in the fixator will rest upon the arms of the lower intermediate layer, the larger slot being joined to a smaller slot, and an upper intermediate layer formed of unconnected right and left arms having a larger, generally U-shaped retaining slot therebetween having a width which is substantially the width of the disc-shaped object, such that an edge portion of the disc-shaped object is retained between the arms of the upper intermediate layer, the larger retaining slot being joined to a smaller slot.

2. The fixator of claim 1, formed of fiberboard.

3. The fixator of claim 1, wherein the arms of the retaining slot diverge slightly to facilitate insertion of the disc-shaped object.

4. The fixator of claim 1, wherein the retaining slot has a width slightly less than the diameter of the disc-shaped object and a thickness 0.1–0.2 mm less than the disc-shaped object, in order to claim the disc-shaped object therein.

5. The fixator of claim 4, wherein the width is about 0.5 mm less than the diameter of the disc-shaped object.

6. The fixator of claim 1, wherein the upper end plate comprises a cut-out portion sufficient to enable viewing of a surface of the disc-shaped object.

7. The fixator of claim 6, wherein the upper end plate is formed with at least one slot extending from the cut-out portion to an edge of the upper end plate to facilitate insertion and withdrawal of the disc-shaped object.

* * * * *